United States Patent
Nakamura et al.

(10) Patent No.: US 9,440,673 B2
(45) Date of Patent: Sep. 13, 2016

(54) STEERING DEVICE

(71) Applicant: JTEKT CORPORATION, Osaka-shi, Osaka (JP)

(72) Inventors: Ryuichi Nakamura, Toyota (JP); Masashi Yamaguchi, Toyota (JP); Ryuji Shibata, Toyokawa (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 14/663,318

(22) Filed: Mar. 19, 2015

(65) Prior Publication Data

US 2015/0274200 A1 Oct. 1, 2015

(30) Foreign Application Priority Data

Mar. 26, 2014 (JP) ................................. 2014-064703

(51) Int. Cl.
*B62D 5/04* (2006.01)
*F16C 27/04* (2006.01)
*F16H 25/24* (2006.01)
*F16C 19/08* (2006.01)

(52) U.S. Cl.
CPC ............ *B62D 5/0448* (2013.01); *F16C 27/04* (2013.01); *F16C 19/08* (2013.01); *F16H 25/24* (2013.01)

(58) Field of Classification Search
CPC ...... B62D 5/0448; F16C 27/04; F16C 19/08; F16H 25/24
See application file for complete search history.

(56) References Cited

U.S. PATENT DOCUMENTS

| 2013/0074626 | A1 | 3/2013 | Speidel |
| 2014/0224567 | A1* | 8/2014 | Kiforiuk ............. B62D 5/0448 180/444 |
| 2014/0345966 | A1 | 11/2014 | Asakura et al. |
| 2015/0049974 | A1 | 2/2015 | Laszlo |

FOREIGN PATENT DOCUMENTS

| DE | 102010038715 A1 | 2/2012 |
| DE | 102012005932 A1 | 9/2013 |
| EP | 2 610 134 A2 | 7/2013 |
| WO | 2011147824 A1 | 12/2011 |
| WO | WO2013056770 | * 4/2013 |

OTHER PUBLICATIONS

Aug. 18, 2015 Extended Search Report issued in European Patent Application No. 15160373.5.

* cited by examiner

*Primary Examiner* — Tony Winner
*Assistant Examiner* — Marlon A Arce
(74) *Attorney, Agent, or Firm* — Oliff PLC

(57) ABSTRACT

A steering device includes a ball screw mechanism 8 that applies a force in the axial direction to a rack shaft of a vehicle, and a bearing that rotatably supports a nut with respect to a housing. The steering device also includes a plate disposed with a gap between the bearing and the plate in a rack shaft axial direction, and a coned disc spring disposed between the bearing and the plate. The plate abuts against the housing in the rack shaft axial direction. The coned disc spring elastically supports the nut in the rack shaft axial direction via the bearing. One side surface of the plate that faces the coned disc spring is formed in a tapered shape so as to cross a rack shaft radial direction.

8 Claims, 11 Drawing Sheets

STEERING DEVICE

INCORPORATION BY REFERENCE

The disclosure of Japanese Patent Application No. 2014-064703 filed on Mar. 26, 2014 including the specification, drawings and abstract, is incorporated herein by reference in its entirety.

BACKGROUND OF THE INVENTION

1. Field of the Invention

The present invention relates to a steering device.

2. Description of the Related Art

An electric power steering device composed of a ball screw mechanism attached to the outer periphery of a rack shaft and a motor coupled to the ball screw mechanism via a speed reduction mechanism is provided as one type of steering devices. In the electric power steering device, when rotation of an output shaft of the motor is transmitted to the ball screw mechanism via the speed reduction mechanism, the ball screw mechanism applies a force in the axial direction to the rack shaft. The force in the axial direction applied to the rack shaft serves as an assist force to assist a driver in performing a steering operation. A support structure for a ball screw mechanism in an electric power steering device of this type according to the related art is described in International Publication No. 2011/147824 (WO 2011/147824).

In the electric power steering device described in WO 2011/147824, as illustrated in FIG. 15, a nut 121 of a ball screw mechanism 120 is supported so as to be rotatable via a bearing 130 with respect to a housing 110 that covers the periphery of a rack shaft 100. Elastic members 140 and plates 141 which are annular are provided in gaps between the bearing 130 and the housing 110 in an axial direction ZA of the rack shaft 100. The plates 141 prevent the elastic members 140 from contacting the housing 110. The bearing 130 is interposed between the elastic members 140, 140 in the rack shaft axial direction ZA. Consequently, the nut 121 is elastically supported in the rack shaft axial direction ZA by the elastic members 140, 140 via the bearing 130.

With such a configuration, when a force in the axial direction ZA is applied to the rack shaft 100 by a steering operation performed by the driver, the nut 121 and the bearing 130 initially move in the axial direction ZA together with the rack shaft 100 against an elastic force from the elastic members 140, and thereafter the nut 121 relatively rotates with respect to the rack shaft 100. Thus, the rack shaft 100 can easily move in the axial direction when a force in the axial direction ZA starts being applied to the rack shaft 100, which reduces the resistance against a steering operation at the initial stage. Therefore, a smooth steering feeling can be obtained.

A coned disc spring 142 such as that illustrated in FIG. 16A may be used as the elastic member 140. In the case where such a coned disc spring 142 is used as the elastic member 140, however, the coned disc spring 142 may be deformed into a closely contacting state illustrated in FIG. 16B when the bearing 130 is moved in the rack shaft axial direction ZA. The term "closely contacting state" refers to a state in which the length of the coned disc spring 142 in the axial direction is equivalent or close to the plate thickness. When the coned disc spring 142 is deformed into a closely contacting state, an excessive stress is applied to the coned disc spring 142. This may shorten the life of the coned disc spring 142.

SUMMARY OF THE INVENTION

It is an object of the present invention to provide a steering device capable of extending the life of a coned disc spring that elastically supports a nut of a ball screw mechanism.

According to an aspect of the present invention, a steering device includes: a ball screw mechanism that includes a cylindrical nut screwed into a screw groove formed in an outer peripheral surface of a steered shaft of a vehicle via a plurality of balls, and that is configured to apply a force in an axial direction to the steered shaft on the basis of rotation of the nut; a motor that applies torque to the nut; a housing that covers a periphery of the steered shaft; a bearing that rotatably supports the nut with respect to the housing; a coned disc spring that elastically supports the nut in the axial direction of the steered shaft when the nut is relatively moved with respect to the housing in the axial direction of the steered shaft; and a plate that restricts movement of the coned disc spring in the axial direction of the steered shaft. The coned disc spring is disposed between the plate and the bearing. A restriction portion that restricts a warp of the coned disc spring is provided in at least one of a space between the coned disc spring and the plate and a space between the coned disc spring and the bearing.

According to the configuration, a warp of the coned disc spring is suppressed by the restriction portion provided in at least one of the space between the coned disc spring and the plate and the space between the coned disc spring and the bearing. Therefore, the coned disc spring is unlikely to be used until a closely contacting state is reached. Consequently, a stress applied to the coned disc spring can be relaxed, which can extend the life of the coned disc spring.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

A steering device according to a first embodiment will be described below. The steering device according to the embodiment is an electric power steering device in which an assist force is applied to a steering mechanism by a motor.

Figure 1:
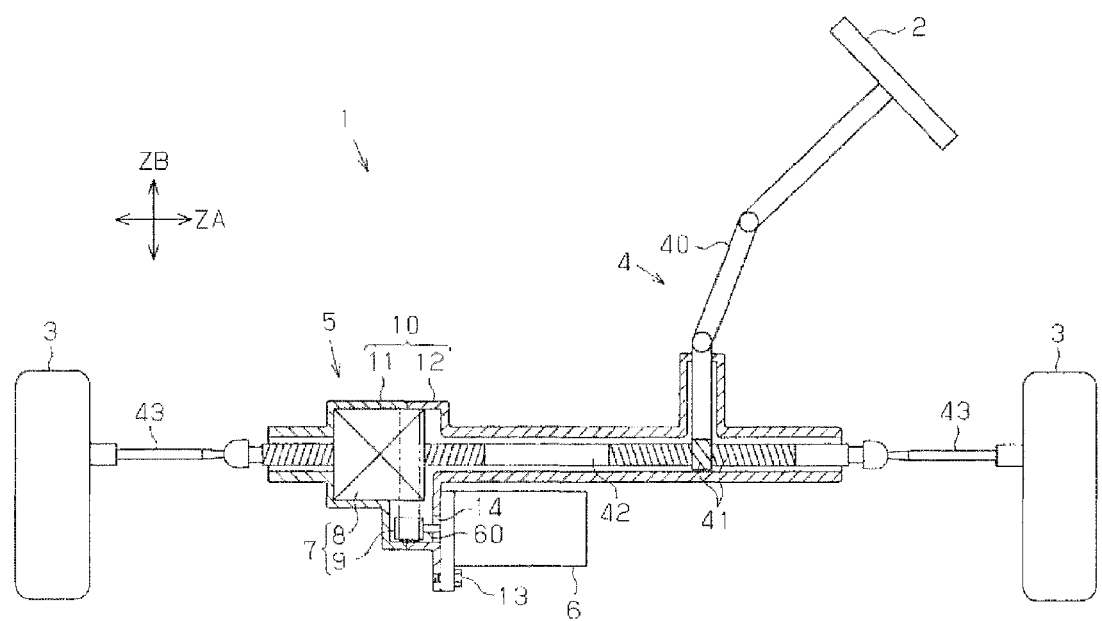
FIG. 1 is a sectional view illustrating a schematic configuration of an electric power steering device according to a first embodiment.

As illustrated in FIG. 1, an electric power steering device 1 includes a steering mechanism 4 that steers steered wheels 3 on the basis of an operation of a steering wheel 2 performed by a driver, and an assist mechanism 5 that assists the driver in performing a steering operation.

The steering mechanism 4 includes a steering shaft 40 that serves as a rotary shaft of the steering wheel 2, and a rack shaft 42 coupled to the lower end portion of the steering shaft 40 via a rack-and-pinion mechanism 41. In the embodiment, the rack shaft 42 corresponds to the steered shaft. With the steering mechanism 4, when the steering shaft 40 is rotated along with an operation of the steering wheel 2 performed by the driver, rotational motion of the steering shaft 40 is converted into reciprocal linear motion of the rack shaft 42 in an axial direction ZA via the rack-and-pinion mechanism 41. Reciprocal linear motion of the rack shaft 42 in the axial direction ZA is transmitted to tie rods 43 coupled to both ends of the rack shaft 42 to vary the steered angle of the steered wheels 3 to change the traveling direction of the vehicle.

The assist mechanism 5 is provided to the rack shaft 42. The assist mechanism 5 is composed of a motor 6 and a power transmission mechanism 7. The power transmission mechanism 7 and the rack shaft 42 are covered by a housing 10. The housing 10 is composed of a first housing 11 and a second housing 12 separated in the axial direction of the rack shaft 42 around the power transmission mechanism 7. The first housing 11 and the second housing 12 are coupled to each other to constitute the housing 10. The motor 6 is assembled to the outer wall of the housing 10 by a bolt 13 such that an output shaft 60 of the motor 6 extends in parallel with the center axis of the rack shaft 42. The output shaft 60 of the motor 6 extends into the housing 10 through a through hole 14 formed in the housing 10. The power transmission mechanism 7 is composed of a ball screw mechanism 8 attached to the outer periphery of the rack shaft 42, and a speed reduction mechanism 9 that transmits rotation of the output shaft 60 of the motor 6 to the ball screw mechanism 8 with the speed of the rotation reduced.

The structure of each of the ball screw mechanism 8 and the speed reduction mechanism 9 will be described.

Figure 2:
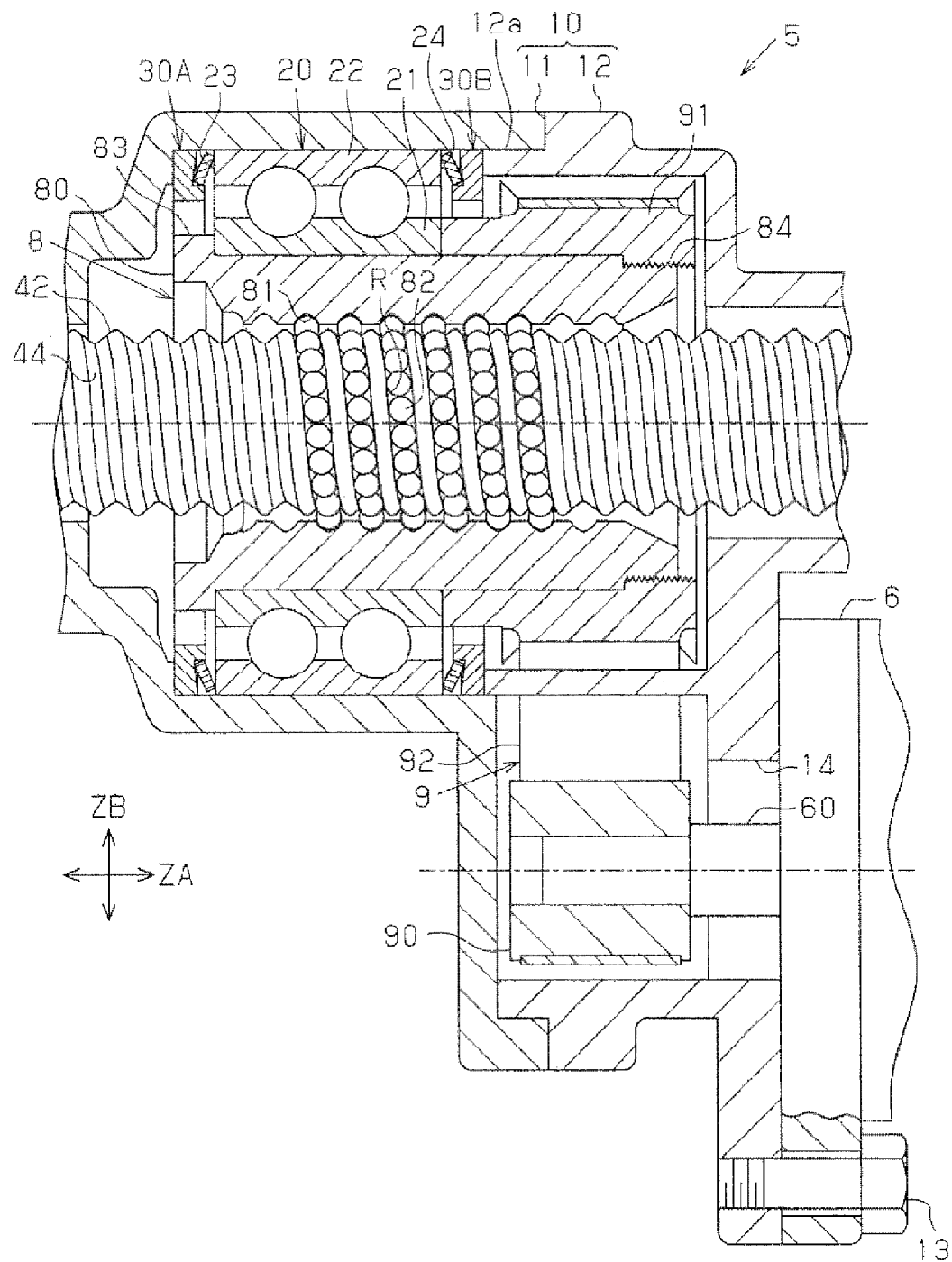
FIG. 2 is a sectional view illustrating the sectional structure of an assist mechanism of the electric power steering device according to the first embodiment.

As illustrated in FIG. 2, a screw groove 44 is formed in the outer peripheral surface of the rack shaft 42. The ball screw mechanism 8 includes a nut 80 screwed into the screw groove 44 of the rack shaft 42 via a plurality of balls 82. A spiral screw groove 81 that faces the screw groove 44 of the rack shaft 42 is formed in the inner peripheral surface of the nut 80. That is, a rolling passage R in which the balls 82 roll is constituted by a spiral space surrounded by the screw groove 44 of the rack shaft 42 and the screw groove 81 of the nut 80. A circulation passage (not illustrated) that short-circuits two locations of the rolling passage R is formed in the nut 80. Thus, the balls 82 can endlessly circulate in the rolling passage R via the circulation passage in the nut 80.

An annular flange portion 83 is formed at one end portion of the nut 80 in the axial direction. An inner ring 21 of a bearing 20 is fitted on the outer peripheral surface of the nut 80 to engage with the flange portion 83 in the axial direction. A driven pulley 91 is also fitted on the outer peripheral surface of the nut 80 adjacent to the inner ring 21 of the bearing 20. The bearing 20 is constituted of a double-row angular contact ball bearing. An external thread portion 84 is formed on the outer peripheral surface of the nut 80 at an end portion that is opposite to the flange portion 83. The driven pulley 91 is screwed into the external thread portion 84 so that the driven pulley 91 is fixed with respect to the nut 80. The inner ring 21 of the bearing 20 is interposed between the driven pulley 91 and the flange portion 83 so that the inner ring 21 of the bearing 20 is fixed with respect to the nut 80. The outer peripheral surface of an outer ring 22 of the bearing 20 abuts against the housing 10 so as to be slidable in the rack shaft axial direction ZA. The nut 80 is supported so as to be rotatable with respect to the housing 10 by the bearing 20.

The speed reduction mechanism 9 includes a driving pulley 90 integrally attached to the output shaft 60 of the motor 6, the driven pulley 91, and a belt 92 wound around the pulleys 90, 91.

In the assist mechanism 5 that is composed of the ball screw mechanism 8 and the speed reduction mechanism 9, when the motor 6 is energized to rotate the output shaft 60 of the motor 6, the driving pulley 90 rotates together with the output shaft 60 of the motor 6. Consequently, the driving pulley 90 rotates the driven pulley 91 and the nut 80 via the belt 92. The ball screw mechanism 8 is driven along with rotation of the nut 80. In the ball screw mechanism 8, when the nut 80 relatively rotates with respect to the rack shaft 42, the balls 82 receive a load from the nut 80 and the rack shaft 42 to endlessly circulate in the rolling passage R. Through endless circulation of the balls 82, torque applied to the nut 80 is transmitted to the rack shaft 42 to relatively move the rack shaft 42 with respect to the nut 80 in the axial direction ZA. That is, a force in the axial direction ZA is applied to the rack shaft 42. The force in the axial direction ZA applied to the rack shaft 42 serves as an assist force to assist the driver in performing a steering operation.

A first support portion 30A is provided between one side surface 23 of the outer ring 22 of the bearing 20 and the first housing 11. The second housing 12 is formed with an extending portion 12a that extends toward the other side surface 24 of the outer ring 22 of the bearing 20. A second support portion 30B is provided between the extending portion 12a of the second housing 12 and the other side surface 24 of the outer ring 22 of the bearing 20. The first support portion 30A and the second support portion 30B elastically support the outer ring 22 of the bearing 20 in the rack shaft axial direction ZA to elastically support the nut 80 in the rack shaft axial direction ZA indirectly. Next, the structure of the first support portion 30A and the second support portion 30B will be discussed in detail. The first support portion 30A and the second support portion 30B have the same structure. Therefore, only the structure of the first support portion 30A will be described below for convenience.

Figure 3:
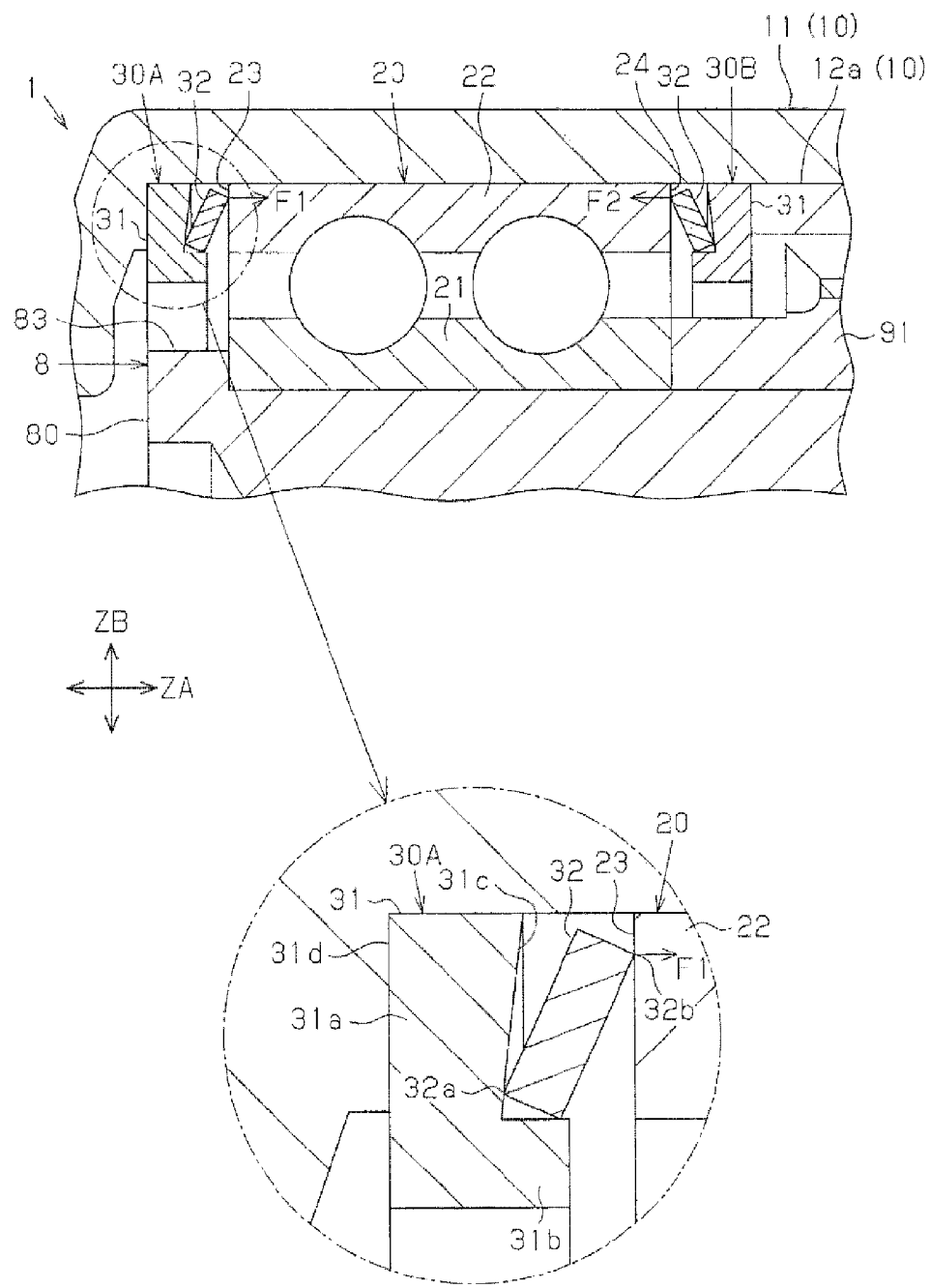
FIG. 3 is a sectional view illustrating the sectional structure of a bearing support portion of a ball screw mechanism of the electric power steering device according to the first embodiment.

As illustrated in FIG. 3, the first support portion 30A is composed of a plate 31 and a coned disc spring 32.

Figure 4:
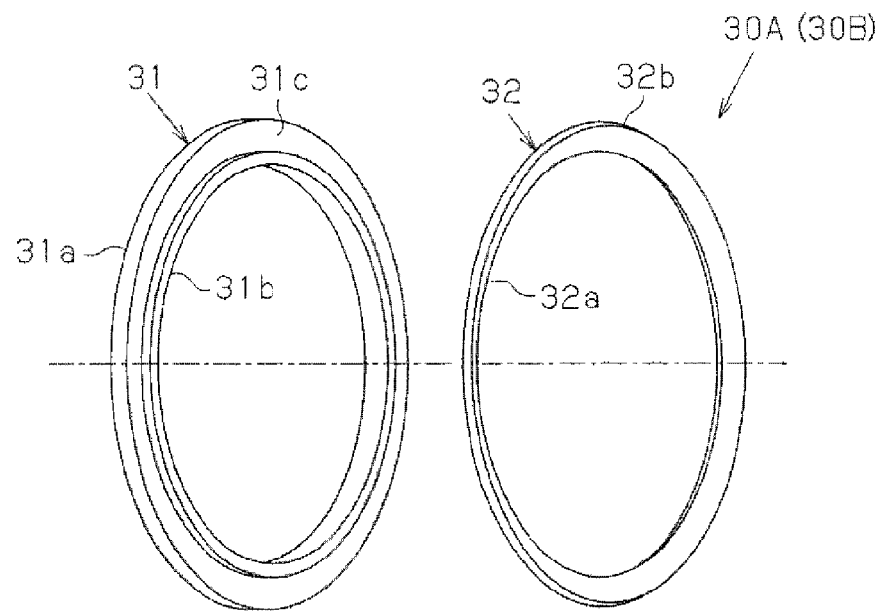
FIG. 4 is a perspective view illustrating the exploded perspective structure of the bearing support portion according to the first embodiment.

As illustrated in FIGS. 3 and 4, the coned disc spring 32 is constituted of a ring-shaped metal member that forms a circular truncated cone. Particularly, the coned disc spring 32 is shaped such that an inner edge portion 32a thereof projects toward one end portion in the axial direction and an outer edge portion 32b thereof projects toward the other end portion in the axial direction.

The plate 31 is constituted of a ring-shaped metal member having a generally L-shaped sectional shape taken in a plane that is orthogonal to the rack shaft axial direction ZA. That is, the plate 31 has a radially extending portion 31a that extends in the radial direction of the plate 31, and an axially extending portion 31b that extends in the axial direction of the plate 31 from the inner peripheral end portion of the radially extending portion 31a. As illustrated in FIG. 3, the plate 31 is disposed with a gap between the outer ring 22 of the bearing 20 and the plate 31 in the rack shaft axial direction ZA. One side surface 31c of the radially extending portion 31a faces the coned disc spring 32. The other side surface 31d of the radially extending portion 31a, which is opposite to the one side surface 31c, abuts against the housing 10 in the rack shaft axial direction ZA. The inner peripheral portion of the coned disc spring 32 is fitted onto the outer periphery of the axially extending portion 31b. The coned disc spring 32 is disposed such that the inner edge portion 32a thereof contacts the radially extending portion 31a of the plate 31 and the outer edge portion 32b thereof contacts the outer ring 22 of the bearing 20. That is, the coned disc spring 32 is disposed between the plate 31 and the outer ring 22 of the bearing 20. The coned disc spring 32 of the first support portion 30A applies an elastic force F1 to the outer ring 22 of the bearing 20. Similarly, the coned disc spring 32 of the second support portion 30B applies an elastic force F2 to the outer ring 22 of the bearing 20. The outer ring 22 of the bearing 20 is elastically supported in the rack shaft axial direction ZA by the respective elastic forces F1, F2 of the first support portion 30A and the second support portion 30B. With such a structure, the nut 80 is elastically supported in the rack shaft axial direction ZA by the first support portion 30A and the second support portion 30B via the bearing 20.

The one side surface 31c of the radially extending portion 31a which faces the coned disc spring 32 is constituted of a tapered surface formed in a tapered shape so as to cross a radial direction ZB of the rack shaft 42. Specifically, the one side surface 31c of the plate 31 is formed in a tapered shape so as to swell toward the coned disc spring 32 as it extends from a portion facing the inner edge portion 32a of the coned disc spring 32 toward a portion facing the outer edge portion 32b of the coned disc spring 32.

According to the electric power steering device 1 described above, the following functions and advantageous effects can be obtained.

Figure 5:
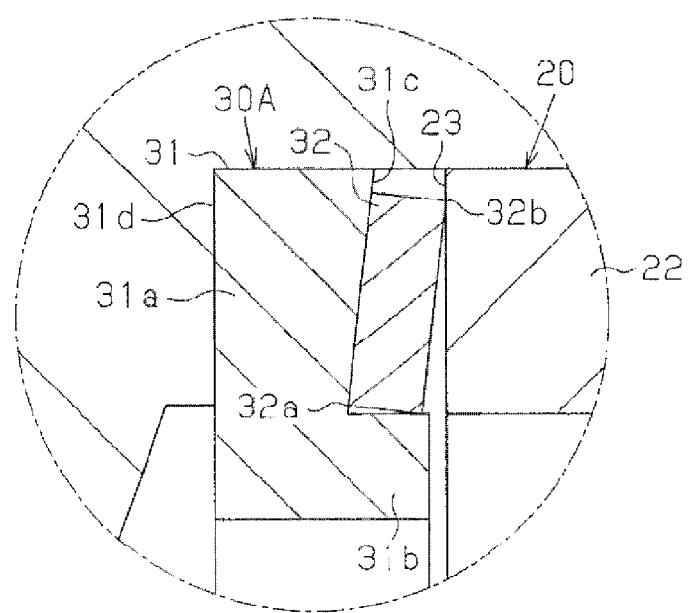
FIG. 5 is a sectional view illustrating an operation example of the bearing support portion according to the first embodiment.

(1) When a force in the axial direction ZA is applied to the rack shaft 42 by a steering operation performed by the driver to integrally displace the nut 80 of the ball screw mechanism 8 and the bearing 20 toward the first support portion 30A, the outer edge portion 32b of the coned disc spring 32 of the first support portion 30A is pressed toward the plate 31 to warp the coned disc spring 32. In this event, when the coned disc spring 32 contacts the one side surface 31c of the plate 31 as illustrated in FIG. 5, a further warp of the coned disc spring 32 is restricted. Consequently, the coned disc spring 32 is unlikely to be deformed into a closely contacting state, which relaxes a stress applied to the coned disc spring 32. Therefore, the life of the coned disc spring 32 can be extended. In addition, the allowable stress of the coned disc spring 32 can be increased. If the allowable stress of the coned disc spring 32 can be increased, the spring constant of the coned disc spring 32 can be increased. Therefore, a greater elastic force can be applied from the coned disc spring 32 to the bearing 20. As a result, a steering feeling with greater rigidity can be achieved at the initial stage of a steering operation.

(2) A warp of the coned disc spring 32 is restricted by surface contact between the one side surface 31c of the plate 31 and the coned disc spring 32, which makes it unlikely for a stress to locally concentrate on the coned disc spring 32 when such a warp is restricted. Therefore, the life of the coned disc spring 32 can be extended.

(3) The plate 31 is formed with the axially extending portion 31b. Consequently, the coned disc spring 32 can be supported in the rack shaft radial direction ZB. Therefore, displacement of the coned disc spring 32 in the rack shaft radial direction ZB can be suppressed.

An electric power steering device 1 according to a second embodiment will be described. Differences of the embodiment from the first embodiment will be mainly described below. In the embodiment, the plate 31 in the first embodiment will be referred to as a first plate for convenience.

Figure 6:
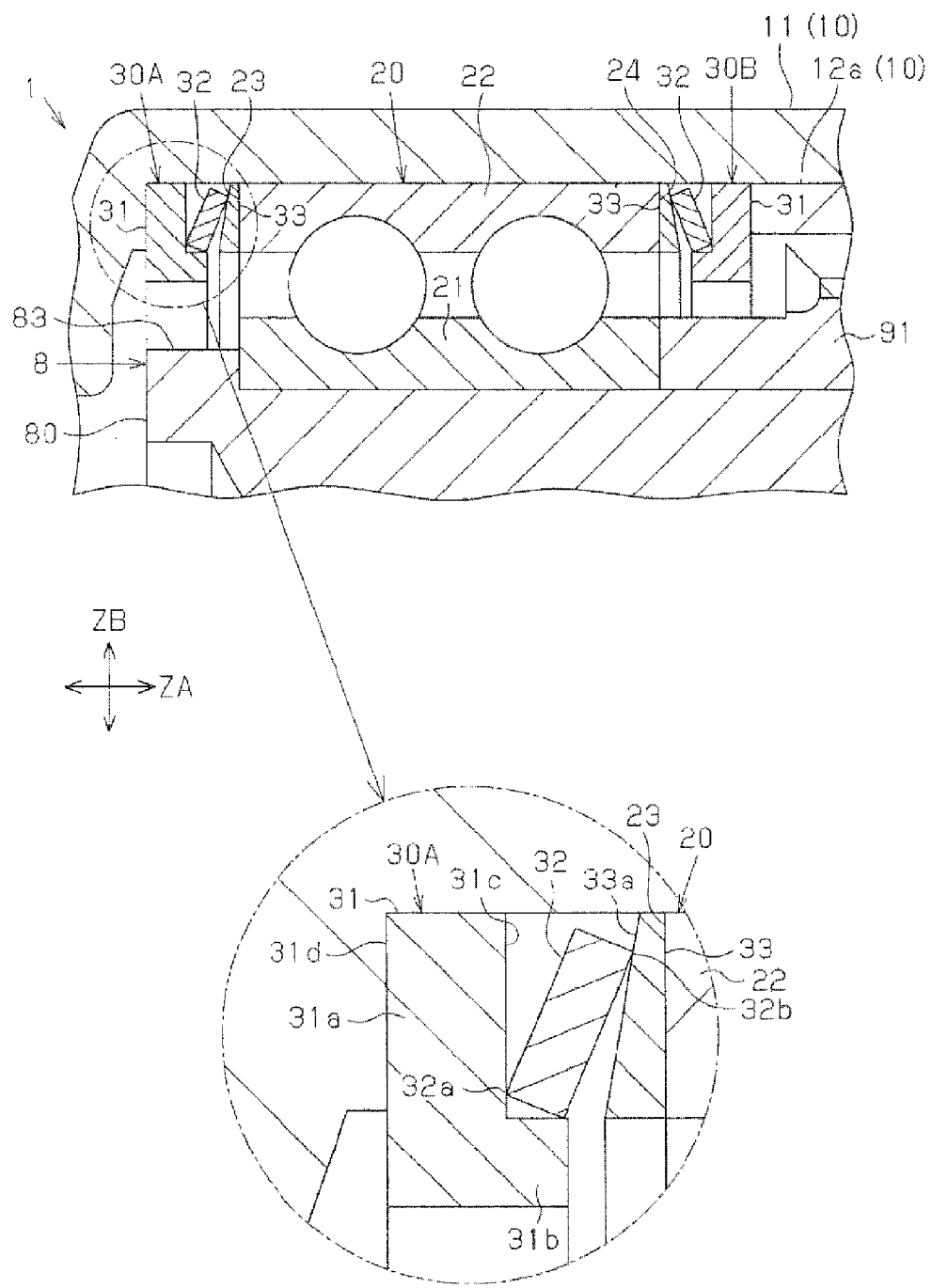
FIG. 6 is a sectional view illustrating the sectional structure of a bearing support portion of a ball screw mechanism of an electric power steering device according to a second embodiment.

In the electric power steering device 1 according to the second embodiment, as illustrated in FIG. 6, a ring-shaped second plate 33 is disposed between the outer ring 22 of the bearing 20 and the coned disc spring 32. The second plate 33 abuts against the outer ring 22 of the bearing 20 in the rack shaft axial direction ZA. The outer edge portion 32b of the coned disc spring 32 contacts the second plate 33. A side surface 33a of the second plate 33 that faces the coned disc spring 32 is constituted of a tapered surface formed in a tapered shape so as to cross the radial direction ZB of the rack shaft 42. Specifically, the side surface 33a of the second plate 33 is formed in a tapered shape so as to swell toward the coned disc spring 32 as it extends from a portion facing the outer edge portion 32b of the coned disc spring 32 toward a portion facing the inner edge portion 32a of the coned disc spring 32.

On the other hand, the one side surface 31c of the plate 31 that faces the coned disc spring 32 is a flat surface that extends in parallel with the radial direction ZB of the rack shaft 42.

According to the electric power steering device 1 described above, the following functions and advantageous effects can be obtained.

Figure 7:
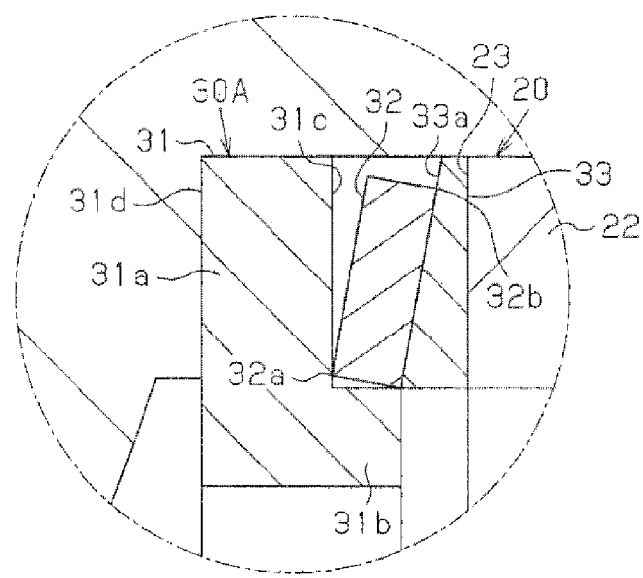
FIG. 7 is a sectional view illustrating an operation example of the bearing support portion according to the second embodiment.

(4) When the nut 80 of the ball screw mechanism 8 and the bearing 20 are integrally displaced toward the first support portion 30A to warp the coned disc spring 32, the coned disc spring 32 is brought into surface contact with the side surface 33a of the second plate 33 as illustrated in FIG. 7, and a further warp of the coned disc spring 32 is restricted. Thus, the coned disc spring 32 is unlikely to be used until a closely contacting state is reached, which relaxes a stress applied to the coned disc spring 32. Therefore, the life of the coned disc spring 32 can be extended.

(5) A warp of the coned disc spring 32 is restricted by surface contact between the side surface 33a of the second plate 33 and the coned disc spring 32, which makes it unlikely for a stress to locally concentrate on the coned disc spring 32 when such a warp is restricted. Therefore, the life of the coned disc spring 32 can be extended.

An electric power steering device 1 according to a modification of the second embodiment will be described.

Figure 8:
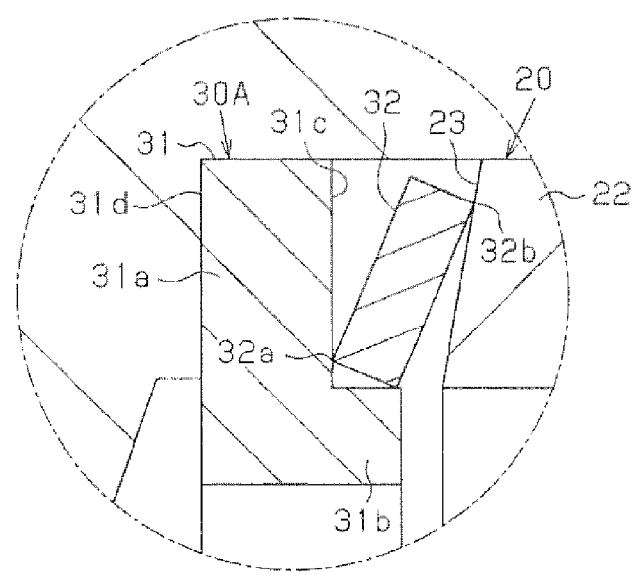
FIG. 8 is a sectional view illustrating the sectional structure of a bearing support portion according to a modification of the second embodiment.

In the electric power steering device 1 according to the modification, as illustrated in FIG. 8, the second plate 33 is excluded, and the one side surface 23 of the outer ring 22 of the bearing 20 is formed in a tapered shape. Specifically, the one side surface 23 of the outer ring 22 of the bearing 20 is formed in a tapered shape so as to swell toward the coned disc spring 32 as it extends from a portion facing the outer edge portion 32b of the coned disc spring 32 toward a portion facing the inner edge portion 32a of the coned disc spring 32. Although not illustrated, the other side surface 24 of the outer ring 22 of the bearing 20, which is opposite to the one side surface 23, is also formed in a tapered shape. With such a configuration as well, the functions and effects similar to (4) and (5) described above can be obtained.

An electric power steering device 1 according to a third embodiment will be described. Differences of the embodiment from the first embodiment will be mainly described below.

Figure 9:
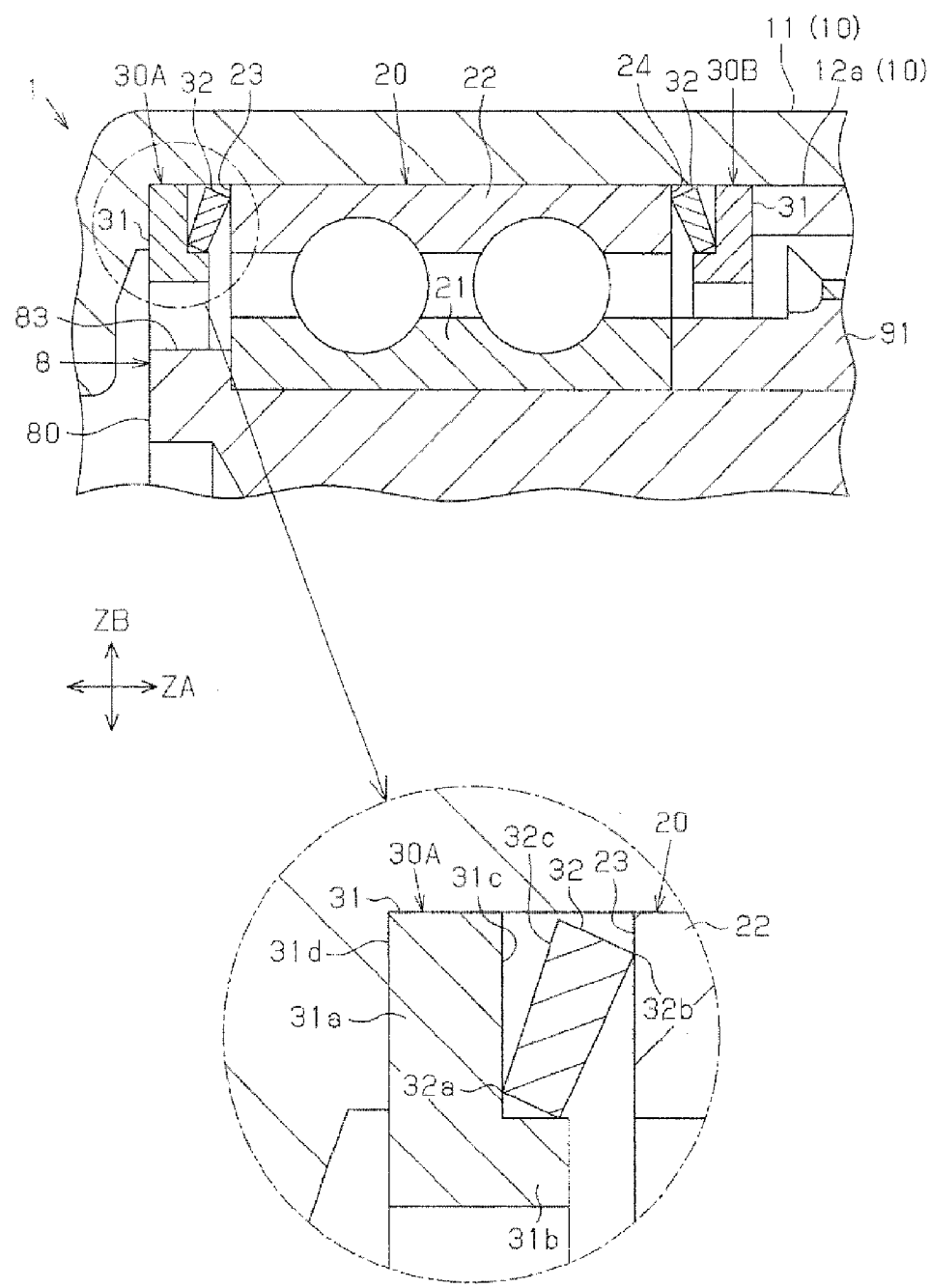
FIG. 9 is a sectional view illustrating the sectional structure of a bearing support portion of a ball screw mechanism of an electric power steering device according to a third embodiment.

In the electric power steering device 1 according to the embodiment, as illustrated in FIG. 9, the one side surface 31c of the plate 31 that faces the coned disc spring 32 is a flat surface that extends in parallel with the radial direction ZB of the rack shaft 42.

On the other hand, one side surface 32c of the coned disc spring 32 in the axial direction that faces the plate 31 is constituted of a tapered surface. Specifically, the one side surface 32c of the coned disc spring 32 is formed in a tapered shape such that the plate thickness of the coned disc spring 32 becomes larger as it extends from the inner edge portion 32a toward the outer edge portion 32b.

According to the electric power steering device 1 described above, the following functions and advantageous effects described below in (6) and (7) can be obtained.

Figure 10:
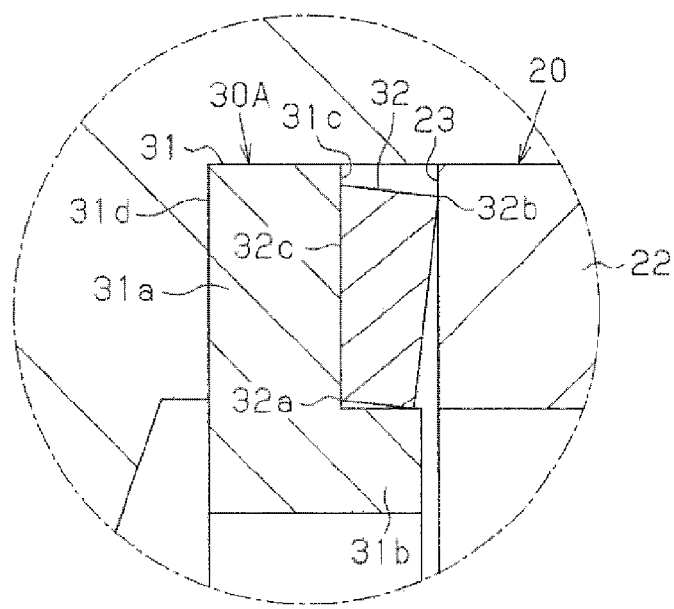
FIG. 10 is a sectional view illustrating an operation example of the bearing support portion according to the third embodiment.

(6) When the nut 80 of the ball screw mechanism 8 and the bearing 20 are integrally displaced toward the first support portion 30A to warp the coned disc spring 32, the one side surface 32c of the coned disc spring 32 is brought into surface contact with the plate 31 as illustrated in FIG. 10, and a further warp of the coned disc spring 32 is restricted. Thus, the coned disc spring 32 is unlikely to be used until a closely contacting state is reached, which relaxes a stress applied to the coned disc spring 32. Therefore, the life of the coned disc spring 32 can be extended.

(7) A warp of the coned disc spring 32 is restricted by surface contact between the one side surface 32c of the coned disc spring 32 and the plate 31, which makes it unlikely for a stress to locally concentrate on the coned disc spring 32 when such a warp is restricted. Therefore, the life of the coned disc spring 32 can be extended.

Each of the embodiments described above may also be implemented in the following forms.

Figure 11:
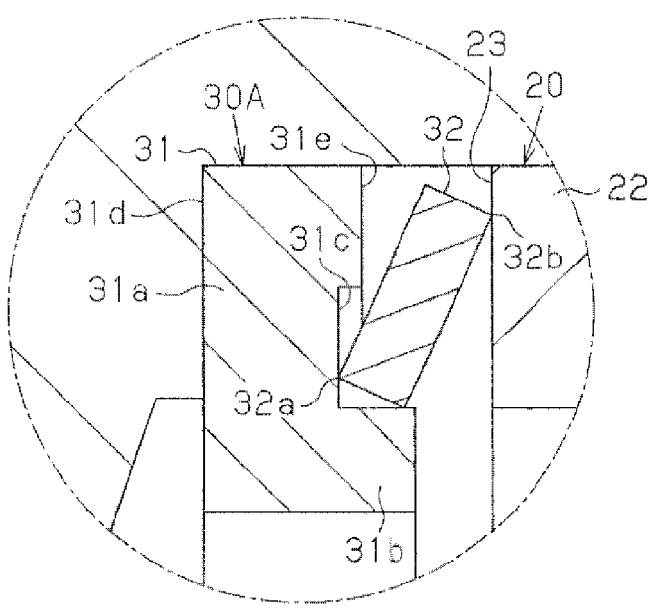
FIG. 11 is a sectional view illustrating the sectional structure of a bearing support portion of a ball screw mechanism of an electric power steering device according to another modification.
Figure 12:
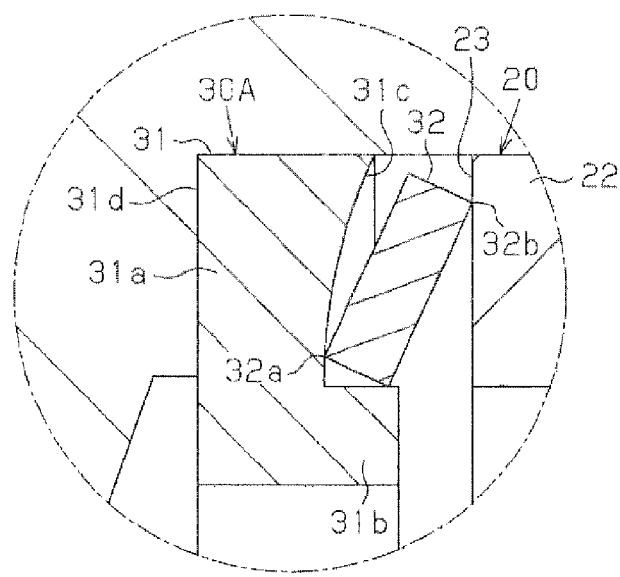
FIG. 12 is a sectional view illustrating the sectional structure of a bearing support portion of a ball screw mechanism of an electric power steering device according to another modification.

In the first embodiment, the one side surface 31c of the plate 31 is formed in a tapered shape. However, the shape of the one side surface 31c of the plate 31 may be changed as appropriate to any shape that can restrict a warp of the coned disc spring 32. For example, a stepped portion 31e may be formed on the one side surface 31c of the plate 31 as illustrated in FIG. 11, or the one side surface 31c of the plate 31 may be formed in a curved shape as illustrated in FIG. 12. In short, it is only necessary that the one side surface 31c of the plate 31 should be provided with a restriction portion that restricts a warp of the coned disc spring 32. In the second embodiment, similarly, the shape of the side surface 33a of the second plate 33 may be changed as appropriate to any shape that can restrict a warp of the coned disc spring 32. In the modification of the second embodiment, the shape of each of the one side surface 23 and the other side surface 24 of the bearing 20 may be changed as appropriate to any shape that can restrict a warp of the coned disc spring 32.

Figure 13:
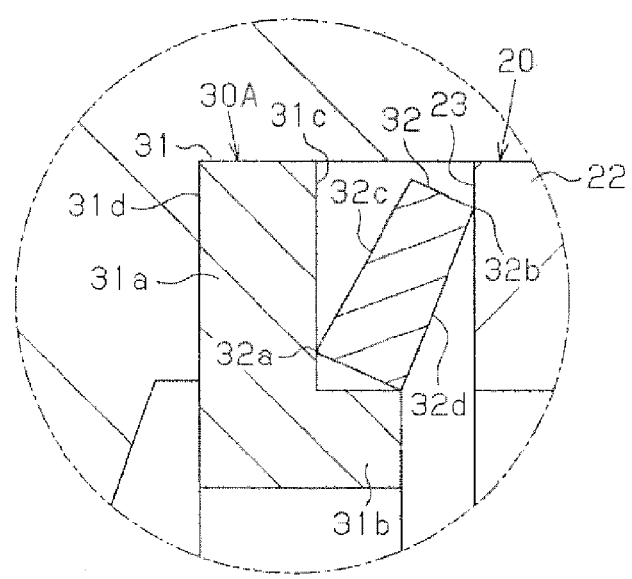
FIG. 13 is a sectional view illustrating the sectional structure of a bearing support portion of a ball screw mechanism of an electric power steering device according to another modification.

In the third embodiment, the one side surface 32c of the coned disc spring 32 is formed in a tapered shape. Instead, however, the other side surface 32d of the coned disc spring 32, which is opposite to the one side surface 32c, may be formed in a tapered shape as illustrated in FIG. 13, for example. Specifically, the other side surface 32d of the coned disc spring 32 is formed in a tapered shape such that the plate thickness of the coned disc spring 32 becomes larger as it extends from the outer edge portion 32b toward the inner edge portion 32a. With such a configuration as well, when the other side surface 32d of the coned disc spring 32 is brought into surface contact with the one side surface 23 of the outer ring 22 of the bearing 20, a further warp of the coned disc spring 32 is restricted. Thus, the coned disc spring 32 is unlikely to be used until a closely contacting state is reached, which can extend the life of the coned disc spring 32. Both the one side surface 32c and the other side surface 32d of the coned disc spring 32 may be formed in a tapered shape. The shape of the one side surface 32c or the other side surface 32d of the coned disc spring 32 is not limited to a tapered shape, and may be changed as appropriate to any shape that can restrict a warp of the coned disc spring 32. In short, it is only necessary that at least one of the one side surface 32c and the other side surface 32d of the coned disc spring 32 should be formed with a restriction portion that restricts a warp of the coned disc spring 32.

Figure 14:
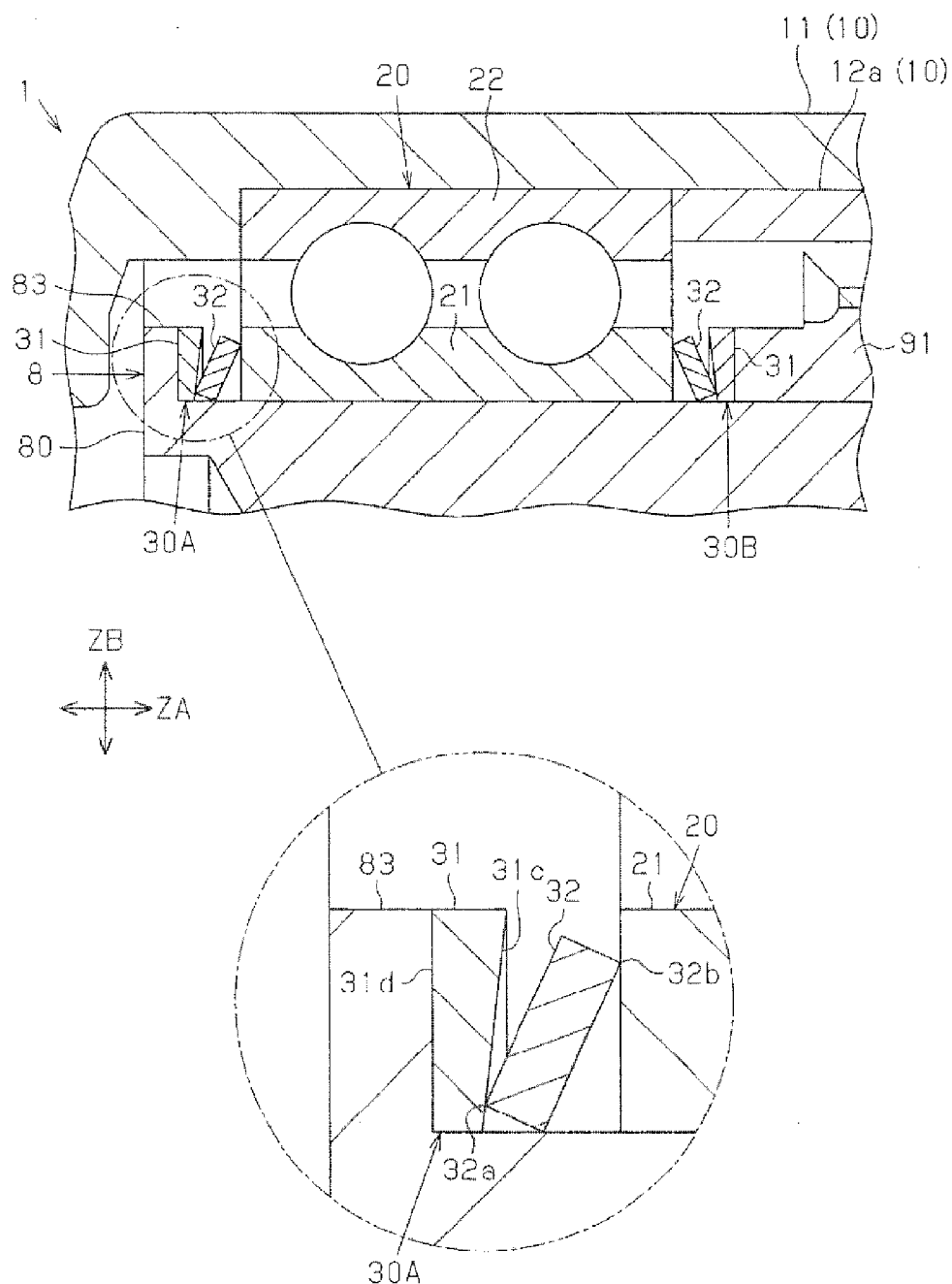
FIG. 14 is a sectional view illustrating the sectional structure of a bearing support portion of a ball screw mechanism of an electric power steering device according to another modification.
Figure 15:
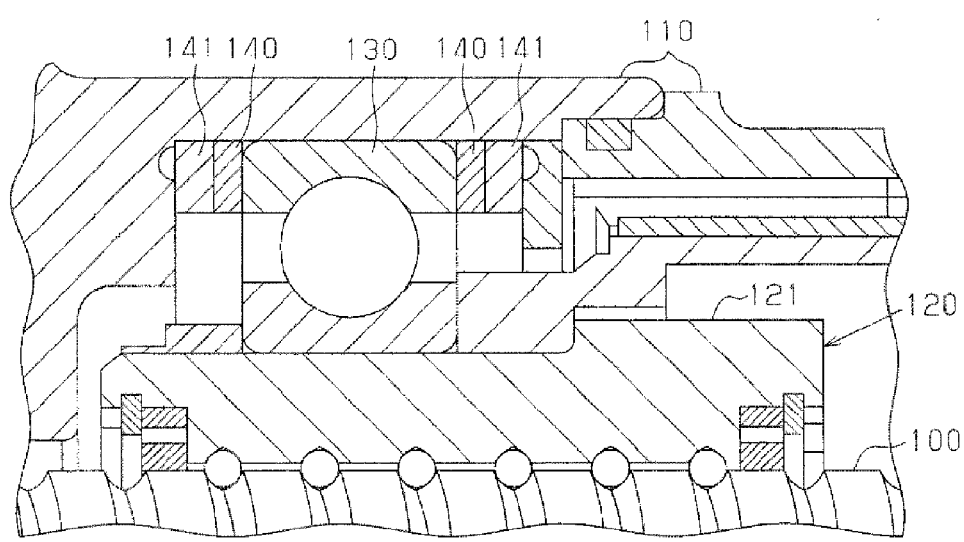
FIG. 15 is a sectional view illustrating the sectional structure of a bearing support portion of a ball screw mechanism of an electric power steering device according to the related art.
Figure 16A:
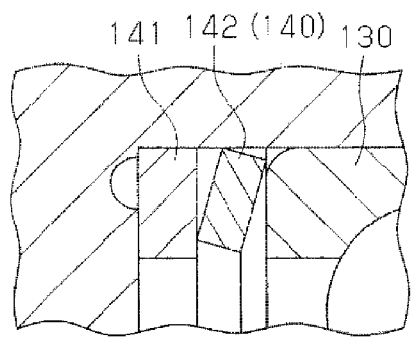
FIG. 16A is a sectional view illustrating an example of the sectional structure of the bearing support portion of the electric power steering device according to the related art.
Figure 16B:
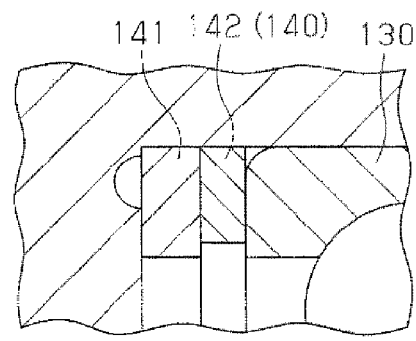
FIG. 16B is a sectional view illustrating an example of the sectional structure of the bearing support portion of the electric power steering device according to the related art.

As illustrated in FIG. 14, the first support portion 30A and the second support portion 30B may be provided to the nut 80. Specifically, as illustrated in FIG. 14, a gap is formed between the flange portion 83 of the nut 80 and the inner ring 21 of the bearing 20, and the first support portion 30A is disposed in the gap. The plate 31 of the first support portion 30A is disposed with a gap between the inner ring 21 of the bearing 20 and the plate 31 in the rack shaft axial direction ZA. The one side surface 31c of the plate 31 faces the coned disc spring 32, and the other side surface 31d of the plate 31, which is opposite to the one side surface 31c, abuts against the flange portion 83 of the nut 80 in the rack shaft axial direction ZA. The one side surface 31c of the plate 31 is constituted of a tapered surface formed in a tapered shape so as to cross the radial direction ZB of the rack shaft 42. The coned disc spring 32 is disposed between the plate 31 and the inner ring 21 of the bearing 20. The second support portion 30B which is similar in structure to the first support portion 30A is disposed between the driven pulley 91 and the inner ring 21 of the bearing 20. The inner ring 21 of the bearing 20 abuts against the nut 80 so as to be slidable in the rack shaft axial direction ZA. The outer ring 22 of the bearing 20 is interposed between the first housing 11 and the extending portion 12a of the second housing 12 to be fixed to the housing 10. With such a configuration as well, the nut 80 can be elastically supported in the rack shaft axial direction ZA by the respective elastic forces of the first support portion 30A and the second support portion 30B. With the one side surface 31c of the plate 31 formed in a tapered shape, the coned disc spring 32 is unlikely to be used until a closely contacting state is reached. Thus, the life of the coned disc spring 32 can be extended, and the allowable stress of the coned disc spring 32 can be increased. It is also possible to apply the configuration of each of the second embodiment, the modification of the second embodiment, and the third embodiment to the modification illustrated in FIG. 14.

The shape of the axially extending portion 31b of the plate 31 may be changed as appropriate if the coned disc spring 32 can be supported in the rack shaft radial direction ZB. In short, it is only necessary that the plate 31 should be provided with a support portion that supports the coned disc spring 32 in the rack shaft radial direction ZB. A support portion including the axially extending portion 31b may be excluded from the plate 31.

In each of the embodiments described above, the bearing 20 is a double-row angular contact ball bearing. However, the bearing 20 is not limited thereto, and other types of bearing may also be used.

The configurations according to the embodiments described above may be applied not only to electric power steering devices but also to steer-by-wire steering devices, for example.

The technical ideas grasped from the embodiments and the modifications described above will be additionally described.

There is provided a steering device, in which: the bearing includes an inner ring that abuts against the nut so as to be slidable in the axial direction of the steered shaft and an outer ring fixed to the housing; the plate is disposed with a gap between the inner ring of the bearing and the plate in the axial direction of the steered shaft, and abuts against the nut in the axial direction of the steered shaft; the coned disc spring is disposed between the inner ring of the bearing and the plate; and the restriction portion is formed on a side surface of the plate that faces the coned disc spring. According to the configuration, the restriction portion can be provided easily.

There is provided a steering device, in which: the bearing includes an inner ring that abuts against the nut so as to be slidable in the axial direction of the steered shaft and an outer ring fixed to the housing; the plate is disposed with a gap between the inner ring of the bearing and the plate in the axial direction of the steered shaft, and abuts against the nut in the axial direction of the steered shaft; the coned disc spring is disposed between the inner ring of the bearing and the plate; and the restriction portion is formed on a side surface of the bearing that faces the coned disc spring. According to the configuration, the restriction portion can be provided easily.

There is provided a steering device, in which: the bearing includes an inner ring that abuts against the nut so as to be slidable in the axial direction of the steered shaft and an outer ring fixed to the housing; the plate is composed of a first plate that is disposed with a gap between the inner ring of the bearing and the first plate in the axial direction of the steered shaft and that abuts against the nut in the axial direction of the steered shaft, and a second plate that abuts against the inner ring of the bearing in the axial direction of the steered shaft; the coned disc spring is disposed between the first plate and the second plate, and elastically supports the nut via the second plate and the bearing; and the restriction portion is formed on a side surface of the bearing that faces the coned disc spring. According to the configuration, the restriction portion can be provided easily.

There is provided a steering device, in which: the bearing includes an inner ring that abuts against the nut so as to be slidable in the axial direction of the steered shaft and an outer ring fixed to the housing; the plate is disposed with a gap between the inner ring of the bearing and the plate in the axial direction of the steered shaft, and abuts against the nut in the axial direction of the steered shaft; the coned disc spring is disposed between the inner ring of the bearing and the plate; and the restriction portion is formed on at least one of one side surface of the coned disc spring that faces the plate and the other side surface of the coned disc spring that faces the bearing. According to the configuration, the restriction portion can be provided easily.

What is claimed is:

1. A steering device comprising:
    a ball screw mechanism that includes a cylindrical nut screwed into a screw groove formed in an outer peripheral surface of a steered shaft of a vehicle via a plurality of balls, and that is configured to apply a force in an axial direction to the steered shaft on the basis of rotation of the nut;
    a motor that applies torque to the nut;
    a housing that covers a periphery of the steered shaft;
    a bearing that rotatably supports the nut with respect to the housing;
    a coned disc spring that elastically supports the nut in the axial direction of the steered shaft when the nut is relatively moved with respect to the housing in the axial direction of the steered shaft; and
    a plate that restricts movement of the coned disc spring in the axial direction of the steered shaft, wherein:
    the coned disc spring is disposed between the plate and the bearing; and
    a restriction portion that restricts a warp of the coned disc spring is provided in at least one of a space between the coned disc spring and the plate and a space between the coned disc spring and the bearing.

2. The steering device according to claim 1, wherein:
    the bearing includes an inner ring fixed to the nut and an outer ring that abuts against the housing so as to be slidable in the axial direction of the steered shaft;
    the plate is disposed with a gap between the outer ring of the bearing and the plate in the axial direction of the steered shaft, and abuts against the housing in the axial direction of the steered shaft;
    the coned disc spring is disposed in the gap between the outer ring of the bearing and the plate, and elastically supports the nut via the bearing; and the restriction portion is formed on a side surface of the plate that faces the coned disc spring.

3. The steering device according to claim 1, wherein:

the bearing includes an inner ring fixed to the nut and an outer ring that abuts against the housing so as to be slidable in the axial direction of the steered shaft;

the plate is disposed with a gap between the outer ring of the bearing and the plate in the axial direction of the steered shaft, and abuts against the housing in the axial direction of the steered shaft;

the coned disc spring is disposed in the gap between the outer ring of the bearing and the plate, and elastically supports the nut via the bearing; and the restriction portion is formed on a side surface of the outer ring of the bearing that faces the coned disc spring.

4. The steering device according to claim 1, wherein:

the bearing includes an inner ring fixed to the nut and an outer ring that abuts against the housing so as to be slidable in the axial direction of the steered shaft;

the plate is composed of a first plate that is disposed with a gap between the outer ring of the bearing and the first plate in the axial direction of the steered shaft and that abuts against the housing in the axial direction of the steered shaft, and a second plate that abuts against the outer ring of the bearing in the axial direction of the steered shaft;

the coned disc spring is disposed between the first plate and the second plate, and elastically supports the nut via the second plate and the bearing; and the restriction portion is formed on a side surface of the second plate that faces the coned disc spring.

5. The steering device according to claim 2, wherein the restriction portion is constituted of a tapered surface formed in a tapered shape so as to cross a radial direction of the steered shaft.

6. The steering device according to claim 1, wherein:

the bearing includes an inner ring fixed to the nut and an outer ring that abuts against the housing so as to be slidable in the axial direction of the steered shaft;

the plate is disposed with a gap between the outer ring of the bearing and the plate in the axial direction of the steered shaft, and abuts against the housing in the axial direction of the steered shaft;

the coned disc spring is disposed in the gap between the outer ring of the bearing and the plate, and elastically supports the nut via the bearing; and the restriction portion is formed on at least one of one side surface of the coned disc spring that faces the plate and the other side surface of the coned disc spring that faces the bearing.

7. The steering device according to claim 6, wherein the restriction portion is constituted of a tapered surface formed in a tapered shape such that a plate thickness of the coned disc spring is varied as the coned disc spring extends from an inner edge portion toward an outer edge portion.

8. The steering device according to claim 1, wherein the plate includes a support portion that supports the coned disc spring in a radial direction of the steered shaft.

* * * * *